(12) United States Patent
Pillay

(10) Patent No.: US 9,521,141 B2
(45) Date of Patent: Dec. 13, 2016

(54) CALLER VALIDATION

(71) Applicant: Bank of America Corporation, Charlotte, NC (US)

(72) Inventor: Sanjay Pillay, Round Rock, TX (US)

(73) Assignee: Bank of America Corporation, Charlotte, NC (US)

( * ) Notice: Subject to any disclaimer, the term of this patent is extended or adjusted under 35 U.S.C. 154(b) by 92 days.

(21) Appl. No.: 14/179,228

(22) Filed: Feb. 12, 2014

(65) Prior Publication Data
US 2015/0229631 A1 Aug. 13, 2015

(51) Int. Cl.
| | | |
|---|---|---|
| G06F 7/04 | (2006.01) |
| H04L 9/32 | (2006.01) |
| G06F 21/00 | (2013.01) |
| H04L 29/06 | (2006.01) |
| G06Q 10/10 | (2012.01) |
| H04W 12/06 | (2009.01) |
| G06F 21/31 | (2013.01) |

(52) U.S. Cl.
CPC .......... H04L 63/083 (2013.01); G06Q 10/10 (2013.01); *G06F 21/31* (2013.01); *H04L 9/32* (2013.01); *H04L 63/08* (2013.01); *H04L 63/0869* (2013.01); *H04W 12/06* (2013.01)

(58) Field of Classification Search
CPC .... H04L 63/08; H04L 63/083; H04L 63/0869; H04L 9/32; G06F 21/31; H04W 12/06
USPC .................. 726/4, 5; 713/169, 182
See application file for complete search history.

(56) References Cited

U.S. PATENT DOCUMENTS

| | | |
|---|---|---|
| 5,181,238 A | 1/1993 | Medamana et al. |
| 5,311,594 A | 5/1994 | Penzias |
| 5,852,653 A | 12/1998 | Reel et al. |
| 5,953,399 A | 9/1999 | Farris et al. |
| 6,154,146 A | 11/2000 | Lueder et al. |
| 6,266,526 B1 | 7/2001 | Kim |
| 6,324,271 B1 | 11/2001 | Sawyer et al. |
| 6,359,880 B1 | 3/2002 | Curry et al. |
| 6,385,724 B1 | 5/2002 | Beckman et al. |

(Continued)

OTHER PUBLICATIONS

Wingfield, Nick. "Swindlers Use Telephones, With Internet's Tactics," The New York Times, Jan. 20, 2014, pp. 1-4, The New York Times Company.

*Primary Examiner* — Aravind Moorthy
(74) *Attorney, Agent, or Firm* — Banner & Witcoff, Ltd.; Michael A. Springs

(57) ABSTRACT

A computer system supports a validation system that enables a business client to validate a business associate who has called the client using a pass phrase. The computer system manages one or more pass phrases that have been previously configured by the business client. The client can then challenge a caller (the purported business associate) with the phrase or keyword to make sure the caller is actually the authorized business associate before providing any sensitive information. Management of phrases and/or keywords may include a computer-executable process where in the client may set up phrases (for example, a challenge question and a corresponding answer) or keyword through an on-line application, telephone, e-mail or any other suitable communication mechanism. The business client may have an option to change, delete or create phrases and/or keywords at any time through appropriate security measures.

20 Claims, 7 Drawing Sheets

(56) References Cited

U.S. PATENT DOCUMENTS

| | | |
|---|---|---|
| 6,456,852 B2 | 9/2002 | Bar et al. |
| 6,542,497 B1 | 4/2003 | Curry et al. |
| 6,604,198 B1 | 8/2003 | Beckman et al. |
| 6,618,370 B1 | 9/2003 | Malik |
| 7,006,986 B1 | 2/2006 | Sines et al. |
| 7,080,048 B1 | 7/2006 | Sines et al. |
| 7,167,551 B2 | 1/2007 | Brown et al. |
| 7,263,720 B2 | 8/2007 | Silvester |
| 7,280,530 B2 | 10/2007 | Chang et al. |
| 7,289,624 B2 | 10/2007 | Brown et al. |
| 7,290,262 B2 | 10/2007 | Blizniak et al. |
| 7,333,477 B2 | 2/2008 | Malik |
| 7,464,267 B2 | 12/2008 | Zhu et al. |
| 7,519,986 B2 | 4/2009 | Singhal |
| 7,599,862 B2 | 10/2009 | Sines et al. |
| 7,599,863 B2 | 10/2009 | Sines et al. |
| 7,693,269 B2 | 4/2010 | Sung et al. |
| 7,711,620 B2 | 5/2010 | Abifaker |
| 7,787,600 B1 | 8/2010 | Bari |
| 7,839,989 B2 | 11/2010 | Brown et al. |
| 7,940,913 B2 | 5/2011 | Patel et al. |
| 7,995,727 B1 | 8/2011 | Chmara et al. |
| 8,019,658 B2 | 9/2011 | Sines et al. |
| 8,073,977 B2 | 12/2011 | Cox et al. |
| 8,172,137 B1 | 5/2012 | Chan |
| 8,194,826 B2 | 6/2012 | Bari |
| 8,260,260 B1 | 9/2012 | Brown et al. |
| 8,280,020 B2 | 10/2012 | Vinokurov et al. |
| 8,285,662 B2 | 10/2012 | Bitonti et al. |
| 8,290,130 B2 | 10/2012 | Cheon et al. |
| 8,325,889 B2 | 12/2012 | Bilstad et al. |
| 8,340,270 B2 | 12/2012 | Jain et al. |
| 8,396,926 B1 * | 3/2013 | Oliver et al. ............... 709/206 |
| 8,467,512 B2 | 6/2013 | Amir et al. |
| 8,504,824 B1 | 8/2013 | Abbott |
| 8,510,842 B2 | 8/2013 | Amit et al. |
| 8,515,038 B2 | 8/2013 | Chmara et al. |
| 8,516,259 B2 | 8/2013 | Gustave et al. |
| 8,521,629 B2 | 8/2013 | Abifaker |
| 8,533,676 B2 | 9/2013 | Watters et al. |
| 8,561,139 B2 | 10/2013 | Singhal |
| 8,606,647 B2 | 12/2013 | Sines et al. |
| 2001/0044309 A1 | 11/2001 | Bar et al. |
| 2002/0133413 A1 | 9/2002 | Chang et al. |
| 2002/0174062 A1 | 11/2002 | Sines et al. |
| 2003/0037239 A1 | 2/2003 | Leung et al. |
| 2003/0091028 A1 | 5/2003 | Chang et al. |
| 2003/0095541 A1 | 5/2003 | Chang et al. |
| 2003/0095542 A1 | 5/2003 | Chang et al. |
| 2003/0108160 A1 | 6/2003 | Brown et al. |
| 2003/0108161 A1 | 6/2003 | Brown et al. |
| 2003/0154162 A1 | 8/2003 | Danaher et al. |
| 2003/0161300 A1 | 8/2003 | Malik |
| 2003/0220993 A1 | 11/2003 | Blizniak et al. |
| 2004/0019563 A1 | 1/2004 | Sines et al. |
| 2004/0066916 A1 | 4/2004 | Brown et al. |
| 2004/0117616 A1 | 6/2004 | Silvester |
| 2004/0176968 A1 | 9/2004 | Syed et al. |
| 2005/0038715 A1 | 2/2005 | Sines et al. |
| 2005/0044363 A1 | 2/2005 | Zimmer et al. |
| 2005/0076246 A1 | 4/2005 | Singhal |
| 2005/0097222 A1 | 5/2005 | Jiang et al. |
| 2005/0125342 A1 | 6/2005 | Schiff |
| 2005/0204356 A1 | 9/2005 | Sundararajan et al. |
| 2005/0238163 A1 | 10/2005 | Brown et al. |
| 2006/0095766 A1 | 5/2006 | Zhu et al. |
| 2006/0120345 A1 | 6/2006 | Sung et al. |
| 2006/0143122 A1 | 6/2006 | Sines et al. |
| 2006/0184428 A1 | 8/2006 | Sines et al. |
| 2006/0190346 A1 | 8/2006 | Sines et al. |
| 2006/0233160 A1 | 10/2006 | Kawanishi et al. |
| 2006/0256950 A1 | 11/2006 | Patel et al. |
| 2007/0005729 A1 | 1/2007 | Cox et al. |
| 2007/0036279 A1 | 2/2007 | Tam et al. |
| 2007/0121863 A1 | 5/2007 | Nagel et al. |
| 2007/0190976 A1 | 8/2007 | Hoshino et al. |
| 2007/0206765 A1 | 9/2007 | Shaffer et al. |
| 2007/0237319 A1 | 10/2007 | Brown et al. |
| 2008/0052164 A1 | 2/2008 | Abifaker |
| 2008/0119165 A1 | 5/2008 | Mittal et al. |
| 2008/0152099 A1 | 6/2008 | Bilstad et al. |
| 2008/0159488 A1 | 7/2008 | Raja |
| 2008/0181379 A1 | 7/2008 | Chow et al. |
| 2008/0187119 A1 | 8/2008 | Vinokurov et al. |
| 2009/0086943 A1 | 4/2009 | Jain et al. |
| 2009/0131790 A1 | 5/2009 | Munrow et al. |
| 2009/0190737 A1 | 7/2009 | Dunmire et al. |
| 2009/0199286 A1 | 8/2009 | Singhal |
| 2009/0210318 A1 | 8/2009 | Abifaker |
| 2009/0270073 A1 | 10/2009 | Ling et al. |
| 2009/0290011 A1 | 11/2009 | Yin et al. |
| 2009/0327131 A1 * | 12/2009 | Beenau ............... G06Q 20/32 705/44 |
| 2010/0029249 A1 | 2/2010 | Bilstad et al. |
| 2010/0054433 A1 | 3/2010 | Gustave et al. |
| 2010/0094718 A1 | 4/2010 | Sines et al. |
| 2010/0094719 A1 | 4/2010 | Sines et al. |
| 2010/0100454 A1 | 4/2010 | Sines et al. |
| 2010/0122341 A1 * | 5/2010 | Golle et al. ............... 726/21 |
| 2010/0281455 A1 | 11/2010 | Anand et al. |
| 2010/0303064 A1 | 12/2010 | Bari |
| 2011/0019807 A1 | 1/2011 | Deng et al. |
| 2011/0026699 A1 | 2/2011 | Amir et al. |
| 2011/0033033 A1 | 2/2011 | Koul et al. |
| 2011/0044436 A1 | 2/2011 | Tam et al. |
| 2011/0085650 A1 | 4/2011 | Cheon et al. |
| 2011/0184910 A1 | 7/2011 | Love et al. |
| 2011/0231471 A1 | 9/2011 | Kudikala et al. |
| 2011/0246366 A1 | 10/2011 | Lai |
| 2011/0261937 A1 | 10/2011 | Chmara et al. |
| 2012/0066674 A1 | 3/2012 | Xie |
| 2012/0095810 A1 | 4/2012 | Miao et al. |
| 2012/0130906 A1 | 5/2012 | Klinker et al. |
| 2012/0198416 A1 | 8/2012 | Sirr et al. |
| 2012/0208505 A1 | 8/2012 | Teng |
| 2012/0239573 A1 | 9/2012 | Sines et al. |
| 2012/0246616 A1 | 9/2012 | Frontiero et al. |
| 2012/0246617 A1 | 9/2012 | Frontiero et al. |
| 2012/0266246 A1 | 10/2012 | Amit et al. |
| 2012/0266248 A1 | 10/2012 | Amit et al. |
| 2012/0282897 A1 | 11/2012 | Gao et al. |
| 2013/0036342 A1 * | 2/2013 | Deo et al. ............... 715/202 |
| 2013/0080332 A1 | 3/2013 | Bilstad et al. |
| 2013/0091491 A1 | 4/2013 | Koutyrine et al. |
| 2013/0091585 A1 * | 4/2013 | Dumais et al. ............... 726/27 |
| 2013/0095802 A1 | 4/2013 | Wang |
| 2013/0174117 A1 | 7/2013 | Watters et al. |
| 2013/0174122 A1 | 7/2013 | Watters et al. |
| 2013/0174124 A1 | 7/2013 | Watters et al. |
| 2013/0301817 A1 | 11/2013 | Chmara et al. |
| 2013/0301818 A1 | 11/2013 | Chmara et al. |
| 2013/0308766 A1 | 11/2013 | Chmara et al. |
| 2013/0339141 A1 * | 12/2013 | Stibel ............... G06F 21/31 705/14.49 |
| 2014/0012694 A1 | 1/2014 | Abifaker |
| 2014/0033281 A1 * | 1/2014 | Asahi et al. ............... 726/4 |
| 2014/0101451 A1 * | 4/2014 | Chan et al. ............... 713/171 |
| 2014/0137219 A1 | 5/2014 | Castro et al. ............... 726/6 |
| 2014/0279516 A1 * | 9/2014 | Rellas ............... G06Q 30/0185 705/44 |
| 2014/0289867 A1 * | 9/2014 | Bukai ............... G06Q 20/4016 726/28 |

* cited by examiner

CALLER VALIDATION

FIELD

Aspects described herein relate to a computer system that facilitates the validation of a business associate by a business client.

BACKGROUND

For years, government officials have warned the public of e-mail frauds that request personal information, known as phishing. Over time, the public education has made it more difficult to trick people with fraudulent e-mail. However, there has been less public outreach about similar new types of telephone schemes, sometimes called "vishing." The occurrence of telephone swindles, where recipients are often asked to provide personal or financial information, is up sharply during the last couple of years. In 2012, the Federal Trade Commission reported that telephone calls accounted for 34 percent of the fraud complaints it received from people who reported how they had been contacted. Telephone fraud was second only to e-mail, which accounted for 38 percent of complaints in 2012.

As an example, a potential victim may receive a telephone call from a swindler saying that their cellphone or bank accounts has been compromised, and that the potential victim needed to provide credit card information. Moreover, the swindler may use software to make the calls look as if they were originating from a legitimate telephone number such as a bank or law firm. Consequently, businesses have begun warning their customers to avoid providing any personal data through their telephones when they receive such calls.

However, there are circumstances when a financial institution may need to urgently contact a client for various reasons such as fraud alert or validating certain transactions. One approach is for a business associate of the financial institution to physically call up the client and request information from the client to validate if the called person on the telephone is actually the client. However, the issue on the client side is for the client to validate that the caller is actually an authorized individual from the financial institution, as opposed to a swindler or other bad actor, before providing such sensitive information to the caller.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses in which a validation system enables a business client to manage a pass phrase (e.g., an answer to a challenge question asked by the client), which is securely available only to the authorized business associate making the call to the client. The business client may be informed by the caller (the purported business associate) that there is an urgent need to talk about the client's account. The client can then challenge a caller with the challenge question to ascertain that the caller is actually the authorized business associate before providing any sensitive information.

In accordance with various aspects of the embodiments, the management of phrases and/or keywords is a computer-executable process where a business client can configure phrases (which may comprise a challenge question and corresponding answer) or keyword using an on-line application, telephone, e-mail, or any other suitable communication mechanism. The approach is that only the business client has knowledge of the phrase or keyword and can ask (challenge) a purported business associate to respond to the challenge question. In addition, the business client may have an option to change, delete or create phrases and/or keywords at any time using a management system that provides the appropriate security measures.

According to one or more aspects, a caller validation system configures one or more pass phrases based on input from a business client. Subsequent to the configuring, a communication connection is initiated from the business client to a business associate. In order to establish a level of trust that the caller is indeed a valid business associate, the business client may challenge the caller to respond with the pass phrase for a corresponding question that has been configured at the caller validation system. The business associate (the caller) can access a data storage device at the caller validation system in order to respond to the business client with the correct pass phrase over the communication connection. Consequently, a degree of trust of the business associate is provided to the business client. In order to enhance the level of trust, the business client may further challenge the caller to respond with additional pass phrases.

According to one or more aspects, when the challenge response from a caller does not match (is not consistent) with the first pass phrase (for example, a business client may have forgotten the previously configured pass phrase), the business client may request a caller validation system to reset the pass phrase, so that a business associate (the caller) can subsequently access the reset pass phrase and correctly respond to the challenge.

According to one or more aspects, a business associate may determine whether the receiver (i.e., called person and the purported business client) is able to challenge the business associate with a question that the intended business client previously configured. If not, the business associate may wish to terminate the call since the receiver may not be the purported business client.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

With traditional approaches, the business client may establish responses to questions that may subsequently be used to challenge a purported client in order to access to the client's account.

In accordance with various aspects of the embodiments, a validation system enables a business client to manage a pass phrase (e.g., an answer to a particular challenge question), which is securely available only to the authorized business associate making a call to the client. The business client may be informed by the caller (the purported business associate) that there is an urgent need to talk about the client's account. The client can then challenge a caller (the purported business associate) with the phrase or keyword to make sure the caller is actually the authorized business associate before providing any sensitive information.

In accordance with various aspects of the embodiments, the management of phrases and/or keywords is supported by a computer-executable process in which the client can set up phrases (which may comprise a challenge question and answer) or keyword using an on-line application, via telephone, e-mail, or any other suitable communication mechanism. The approach is that only the business client has knowledge of the phrase or keyword and can ask (challenge) a purported business associate to respond to the challenge question. The business client may have an option to change, delete or create phrases and/or keywords at any time using a management system that provides the appropriate security measures.

In accordance with various aspects of the embodiments, a validation system may support different types of businesses, including financial institutions, retailers, government agencies, insurance companies, medical clinics and hospitals, and airline companies.

The steps that follow in FIGS. 1-5 may be implemented by one or more of the components in FIGS. 6 and 7 and/or other components, including other computing devices as will be discussed.

Figure 1:
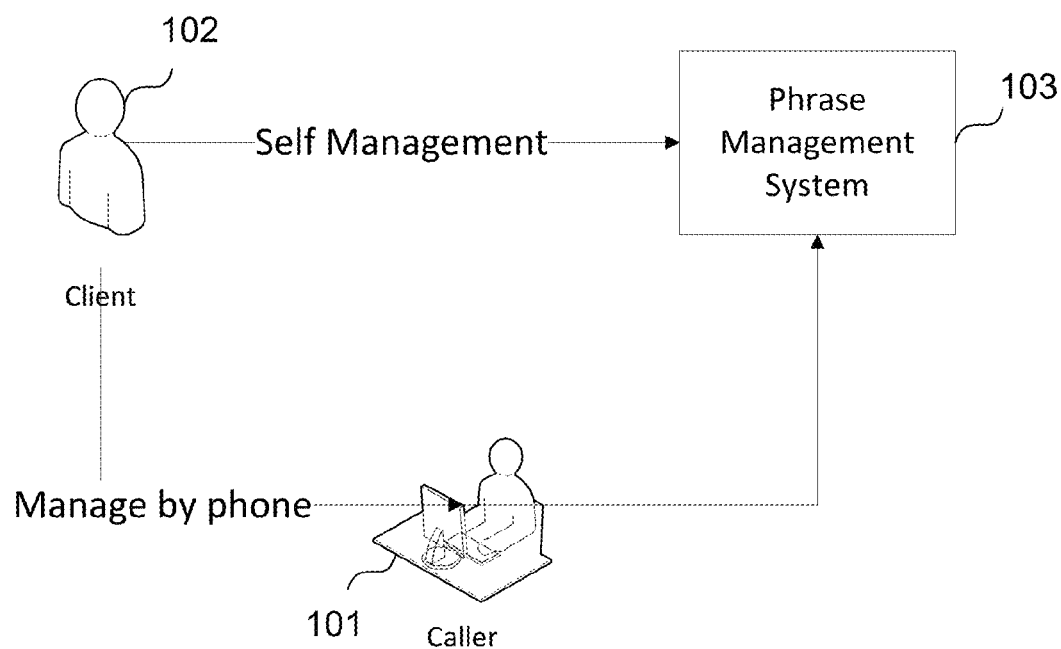
FIG. 1 shows an exemplary scenario for authenticating a caller according to one or more aspects of the present disclosure.

FIG. 1 shows an exemplary scenario for authenticating a caller according to one or more aspects of the present disclosure. A caller 101 (who is purportedly a business associate of a business, e.g., financial institution) calls business client 102. When challenged by client 102, caller 101 must provide a challenge response that was previously established by client 102. For example, client 102 may have created a challenge comprising a personalized question and a corresponding answer. The business client accesses the previously established pass phrase (e.g., answer to a question or keyword) from phrase management system 103 (for example, as implemented in computer environment 600 as shown in FIG. 6). If caller 101 is able to respond with the correct pass phrase, client 102 will have a degree of trust that caller 101 is a valid business associate. That being the case, client 102 may continue with the call and provide information to caller 101 or take requested action about the client's account.

Business client 102 may establish one or more pass phrases through phrase management system 103. In order for business client 102 to do so, however, phrase management system 103 may verify the business client using security measures already configured for the business client to access the client's account. For example, client verification may require that the client enter a password or to respond to security questions that the client already created. As will be further discussed, business client 102 may then create a set of challenge questions and corresponding answers. The questions may be selected by client 102 from a group of pre-determined questions or may be personalized by client 102.

With an aspect of the embodiments, pass phrases may assume different formats. For example, business client 102 may enter different questions and corresponding answers through phrase management system 103 such as with text input via e-mail or a secure website. Alternatively, business client 102 may contact phrase management system 103 through telephone, and articulate a question and corresponding answer. The speech waveform itself or a text representation (through speech-to-text conversion) of the speech waveform may be saved for future access by business associate 101 when challenged.

With an aspect of the embodiments, business client 102 may upload a digital picture, image, or other graphical content to phrase management system 103 when configuring a pass phrase. Business client 102 may then challenge business associate 101 by asking about the uploaded graphical content (e.g., "What picture do you see?"). In addition, business client 102 may configure specific questions about the uploaded graphical content that may be asked during a challenge.

With an aspect of the embodiments, a pass phrase may include a question and a corresponding answer so that business client 102 can ask the question and business associate 101 can respond with the correct answer by accessing phrase management system 103. With some embodiments, business associate 101 may access a text representation of the answer and articulate the answer to business client 101. However, business associate 101 may access a waveform representation of business client 102 articulating the answer when client 102 previously configured the pass phrases through phrase management system 103. Business associate 101 may then play back the waveform to business client 102.

With an aspect of the embodiments, the question asked by business client 102 may be converted into a format (e.g., speech waveform to an alphanumeric sting) and provided to phrase management system 103 to access the corresponding answer. Phrase management system 103 may then search the set of configured questions of business client 101 to determine if the asked question is valid. For example, if the question is found in the appropriate data structure, phrase management system 103 returns the corresponding answer, which may be presented directly to client 102 or via business associate 101.

Figure 2:
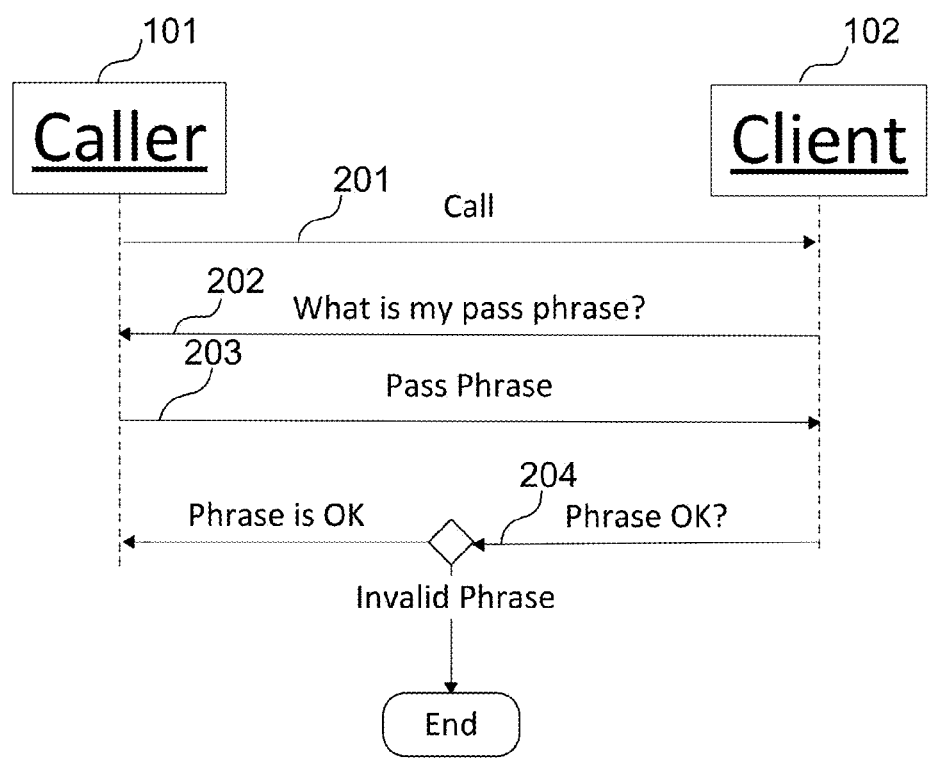
FIG. 2 shows an exemplary interaction flow between a business associate and a business client thus authenticating the business associate according to one or more aspects of the present disclosure.

FIG. 2 shows exemplary interaction flow between a business associate and a business client authenticating the business associate according to one or more aspects of the present disclosure. As discussed, the exemplary interaction flow parallels the scenario shown in FIG. 1.

Caller 101, who is purportedly a business associate, initiates call 201 to business associate 102 to resolve, for example, an issue with the client's account. For example, a financial institution may detect possible fraudulent usage of the client's credit and need to verify whether or not a charge is legitimate. With an embodiment of the disclosure, a business associate (caller 101) may access the client's profile so that phrase management system 103 can initiate call 201 (which may be referred as a communication connection) to client 102 using the telephone number that is registered in the client's profile. With another aspect of the disclosure, a communication connection may be supported as a telephone call, e-mail, webpage, and the like.

Figure 5:
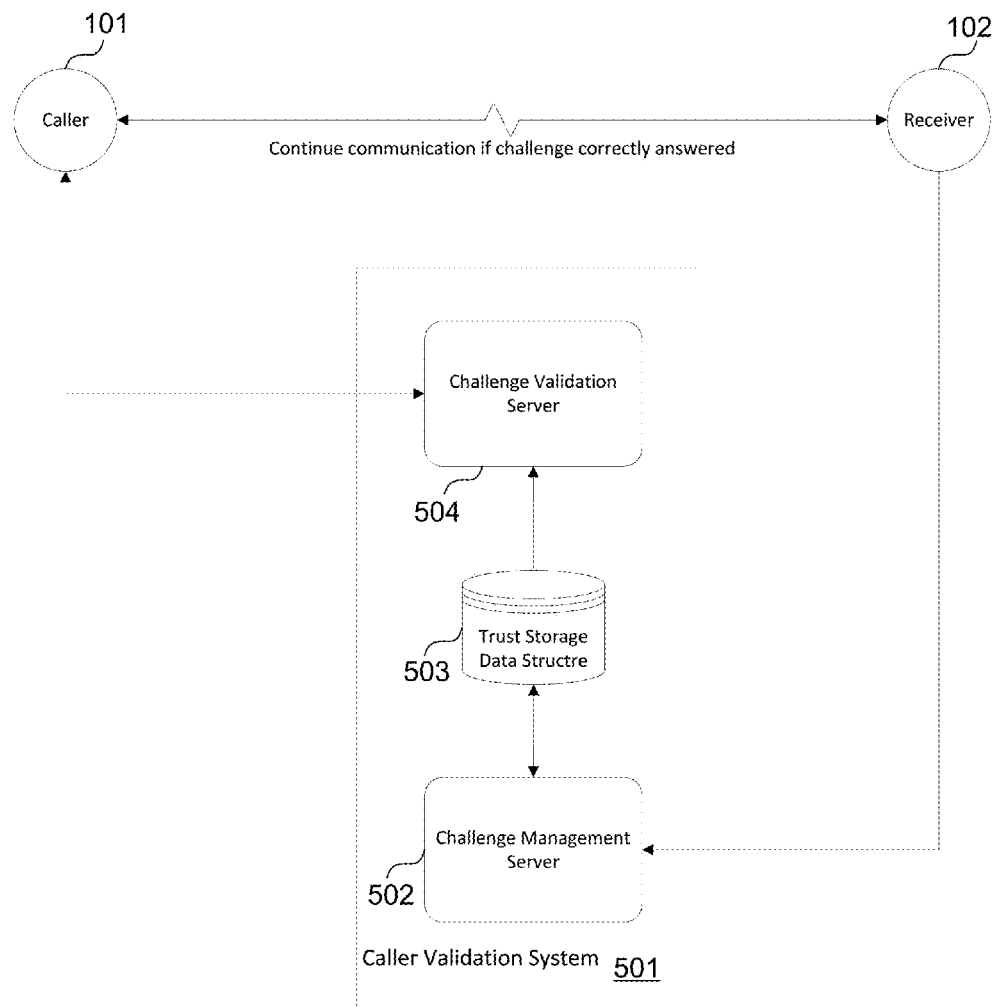
FIG. 5 shows a validation system for validating a business client according to one or more aspects of the present disclosure.

At the time of answering the call 201, business client 102 may not established trust that caller 101 is a legitimate business associate of the business, but has previously configured a set of pass phrases through phrase management system 103 or challenge management server 504 as shown in FIGS. 1 and 5, respectively. If so, business client 102 may issue challenge request 202 to caller 101. In order to successfully respond to challenge request 202, caller 101 must respond to business client 102 with pass phrase 203 that was previously created by business client 102. For example, business client 102 may ask one or more of previously configured questions (corresponding to "What is my pass phrase" 203, e.g., "What is my pet's name"). Assuming that caller 102 is a legitimate business associate, caller 102 accesses phrase management system 103 to obtain the client's previously configured answer (corresponding to "Pass Phrase" 203, e.g., "Fido").

Business client 102 determines whether challenge response 203 is correct (corresponding to "Phrase ok" 204) so that business client 102 can decide whether to continue with the call. However, if business client 102 may terminate the call (e.g., hangs up on call 201) or further challenge caller 101 as will be further discussed.

Figure 3:
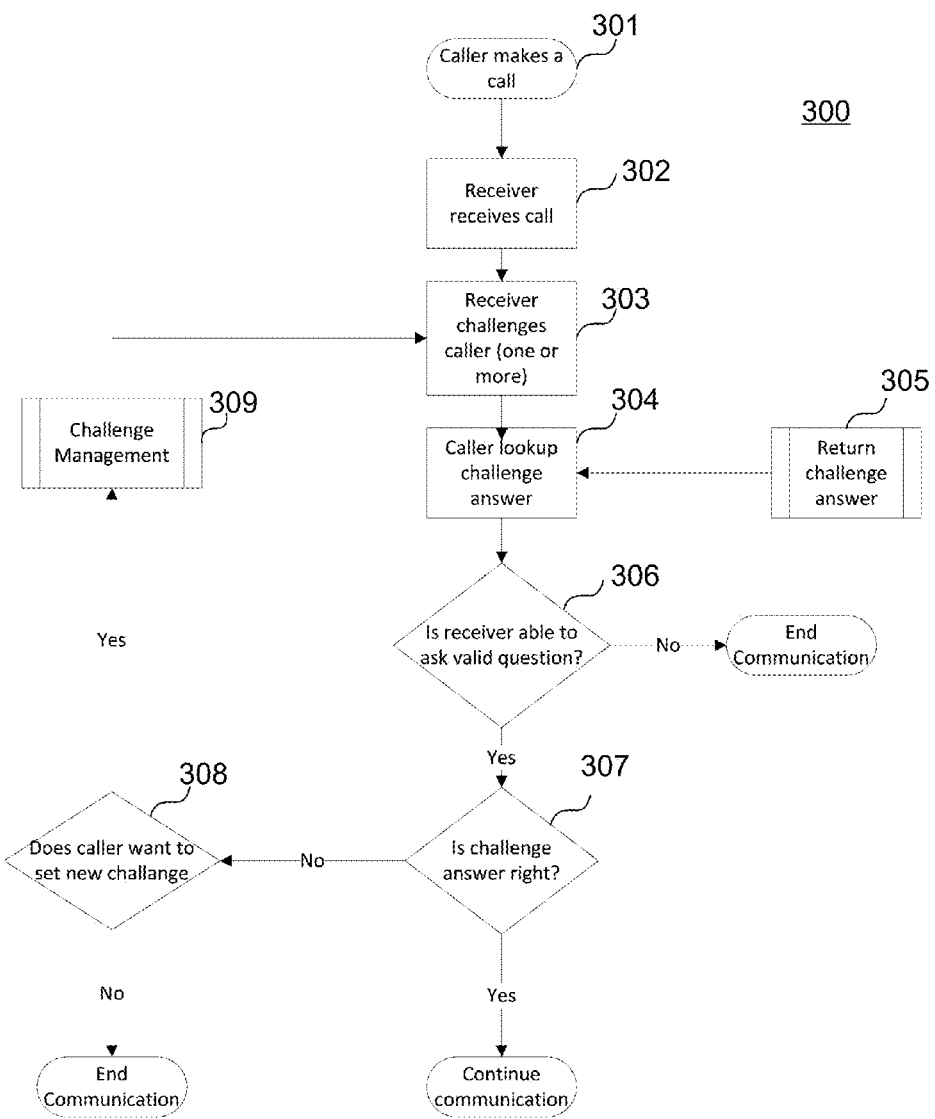
FIG. 3 shows a flow chart for validating a business client according to one or more aspects of the present disclosure.

FIG. 3 shows a flow chart 300 for validating a business client according to one or more aspects of the present disclosure. Process 300 is initiated by caller 101 making a call (for example, through the telecommunication system of the business) to business client (e.g., corresponding to the registered telephone number e-mail address) at block 301 and the receiver (the purported business client) answers the call at block 302.

At block 303, in order to establish trust about caller 101, business client 102 challenges caller 101 by asking for the correct pass phrase. If caller 101 is a business associate, caller 101 is able to access phrase management system 103 (corresponding to challenge validation server 502 as shown in FIG. 5), caller 101 can obtain and respond with the phrase (e.g., keyword or answer to a challenge question previously entered by client 102) at blocks 304 and 305.

While blocks 303-305 are directed the client's trust of caller 101, an aspect of the invention is directed to the caller's trust of the receiver (i.e., called person who is purportedly business client 102). For example, at block 306 the caller (who is business associate 101) determines whether the called person is able to challenge business associate 101 with a valid question (i.e., one or more questions that were previously configured by business client 102). In order to do so, business associate 101 may access phrase management system 103 to access all of the questions previously configured by business associate 102. With an aspect of the disclosure, challenge validation server 504 (as shown in FIG. 5) may search data storage device 503 for the question asked by client 102. For example, business associate 101 may input the question as a database parameter so that challenge validation server 504 can search the client's set of configured questions. If the called person is unable to ask a valid question, business associate 102 may deem that the called person is not the intended business client and may consequently terminate the call or ask the called person for clarification. For example, the called person may be someone (e.g., spouse) other than the business client that answered the telephone at the registered telephone number.

At block 307, the called person (who is the intended business client) determines whether the answer presented by the caller is correct. If so, the business client 102 may have sufficient trust that the caller is indeed a business client so business client 102 continues with the call. However, with some embodiments, business client 102 may ask one or more additional challenge questions that were previously configured in order to be sufficiently certain that the caller is an associate of the business (i.e., increasing the degree of trust).

In some situations, business client 102 may have forgotten the pass phrase or may have never configured a pass phrase before the call. In such situations, business associate 102 may set the pass phrase at blocks 308 and 309 using existing security measures that are typically provided for accessing the client's account. After the pass phrase has been set (which may occur during the current call), blocks 303-307 may be repeated so that adequate trust is established between the caller and the called person.

Figure 4:
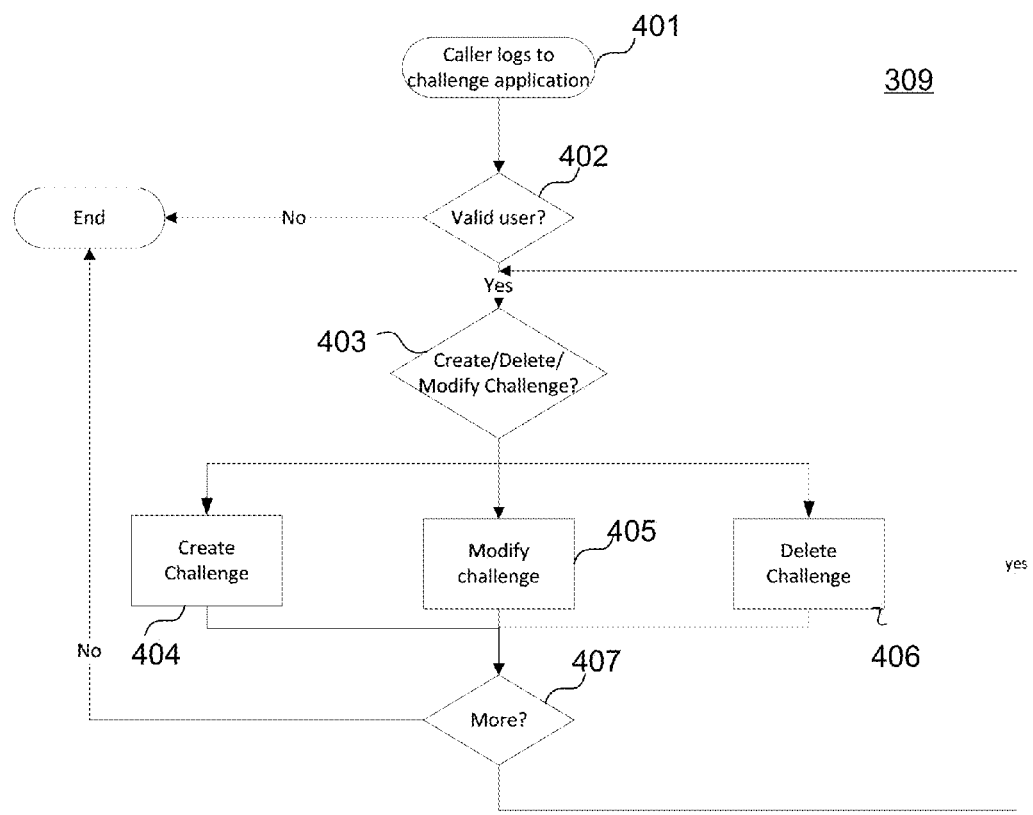
FIG. 4 shows a flow chart for a challenge management server according to one or more aspects of the present disclosure.

In reference to FIG. 3, FIG. 4 shows flow chart 309 for challenge management according to one or more aspects of the present disclosure. Challenge management 309 is a process in which the business client can set up one or more challenge phrases or keywords via on-line application, telephone, e-mail, or any other communication mechanism. The approach is that only the client has knowledge about what the phrase is and has an option to change it any time.

At block 401, a business client logs into phrase management system 103 (for example, corresponding to challenge management server 504 as shown in FIG. 5). At block 402, phrase management system 103, verifies that the user is a valid business client, for example, using security measures previously established for the business client to access the client's account information.

At block 403-406, the user may create, modify, or delete a pass phrase (e.g., challenge question and corresponding answers). The business client may repeat blocks 403-406 through block 407 to configure a plurality of pass phrases from which the business client may subsequently select one of a plurality of pass phrases when challenging a caller.

With an embodiment of the disclosure, a pass phrase may assume one of a different type of formats. For example, a business client may enter alphanumeric information that represents a challenge question and corresponding information. Alternatively, a pass phrase may capture a speech waveform of the business client articulating a pass phrase, which may be accessed and played to the business client when the business associate is challenged. With some embodiments, the speech waveform may be converted to a text format so that a business associate accesses a text representation when challenged by the business client.

FIG. 5 shows caller validation system 501 (corresponding to phrase management system 103 as shown in FIG. 1) for validating a business client according to one or more aspects of the present disclosure.

Validation system 501 comprises challenge management server 502, storage device 503, and challenge validation servicer 504. A business client may configure one or more pass phrases through server 502. When successfully configured, the pass phrases are stored in storage device 503 so that a business associate can access them via server 504 when challenged by the business client.

Figure 6:
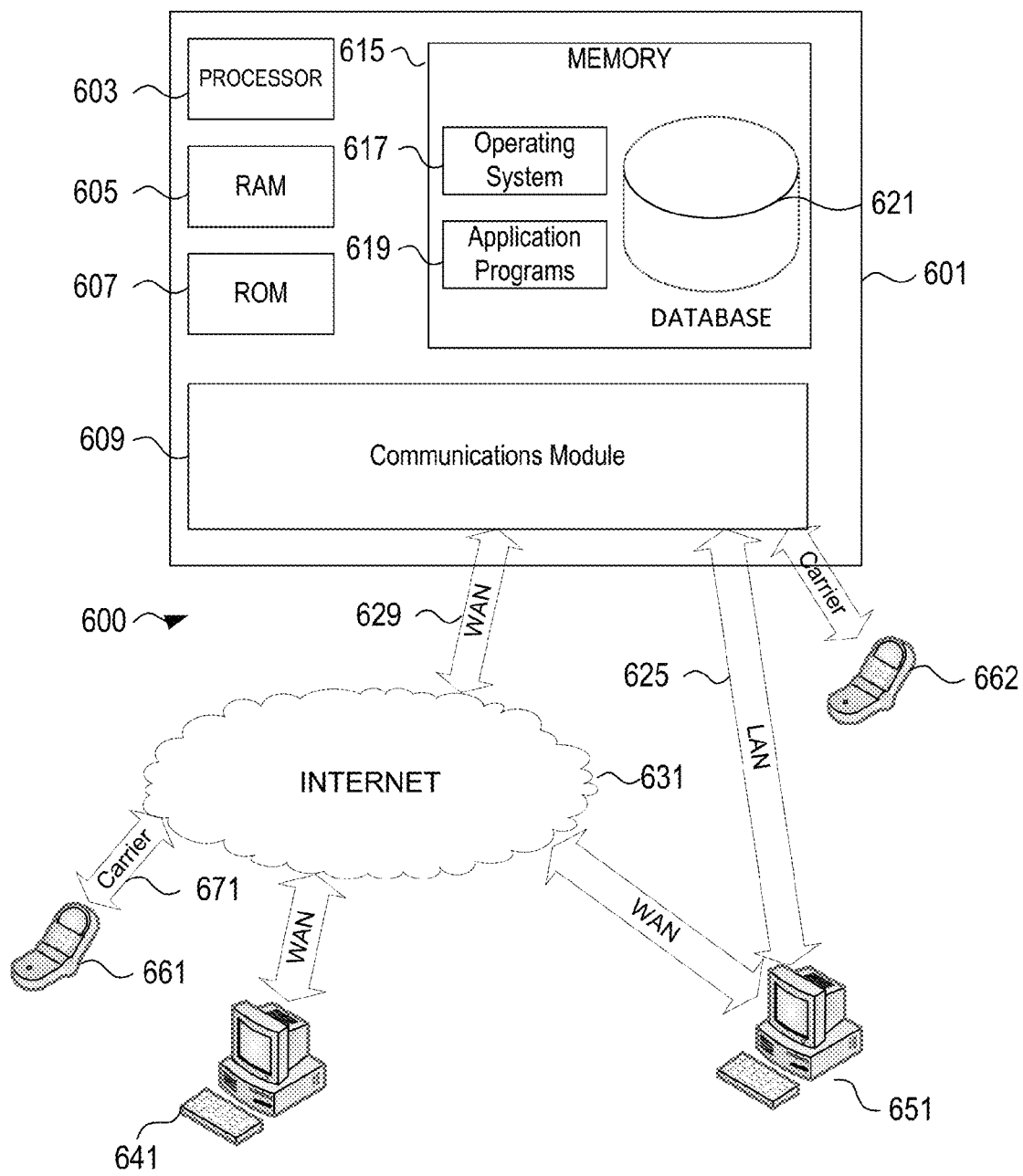
FIG. 6 illustrates an example of a suitable computing system environment that may be used according to one or more illustrative embodiments.

FIG. 6 illustrates an example of a suitable computing system environment 600 that may be used according to one or more illustrative embodiments. For example, as will be further discussed, computing system environment 600 may support servers 502-504, as shown in FIG. 5, performing processes 300 and 400 as shown in FIGS. 3 and 4, respectively, to validate a caller for a business client. The computing system environment 600 is only one example of a suitable computing environment and is not intended to suggest any limitation as to the scope of use or functionality contained in the disclosure. The computing system environment 600 should not be interpreted as having any dependency or requirement relating to any one or combination of components shown in the illustrative computing system environment 600.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 6, the computing system environment 600 may include a computing device 601 wherein the processes discussed herein may be implemented. The computing device 601 may have a processor 603 for controlling overall operation of the computing device 601 and its associated components, including random-access memory (RAM) 105, read-only memory (ROM) 607, communications module 609, and memory 615. Computing device 601 typically includes a variety of computer readable media. Computer readable media may be any available media that may be accessed by computing device 601 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 601.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 600 may also include optical scanners (not shown). Exemplary usages include scanning and converting paper documents, e.g., correspondence and receipts to digital files.

Although not shown, RAM 605 may include one or more are applications representing the application data stored in RAM 605 while the computing device is on and corresponding software applications (e.g., software tasks), are running on the computing device 601.

Communications module 609 may include a microphone, keypad, touch screen, and/or stylus through which a user of computing device 601 may provide input, and may also include one or more of a speaker for providing audio output and a video display device for providing textual, audiovisual and/or graphical output.

Software may be stored within memory 615 and/or storage to provide instructions to processor 603 for enabling computing device 601 to perform various functions. For example, memory 615 may store software used by the computing device 601, such as an operating system 617, application programs 619, and an associated database 621. Also, some or all of the computer executable instructions for computing device 601 may be embodied in hardware or firmware.

Computing device 101 may operate in a networked environment supporting connections to one or more remote computing devices, such as computing devices 641, 651, and 661. The computing devices 641, 651, and 661 may be personal computing devices or servers that include many or all of the elements described above relative to the computing device 601. Computing device 661 may be a mobile device communicating over wireless carrier channel 671.

The network connections depicted in FIG. 1 include a local area network (LAN) 625 and a wide area network (WAN) 629, but may also include other networks. When used in a LAN networking environment, computing device 601 may be connected to the LAN 625 through a network interface or adapter in the communications module 609. When used in a WAN networking environment, the computing device 601 may include a modem in the communications module 609 or other means for establishing communications over the WAN 129, such as the Internet 631 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 619 used by the computing device 601, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 601. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 601. Such a processor may execute computer-executable instructions stored on a computer-readable medium.

Figure 7:
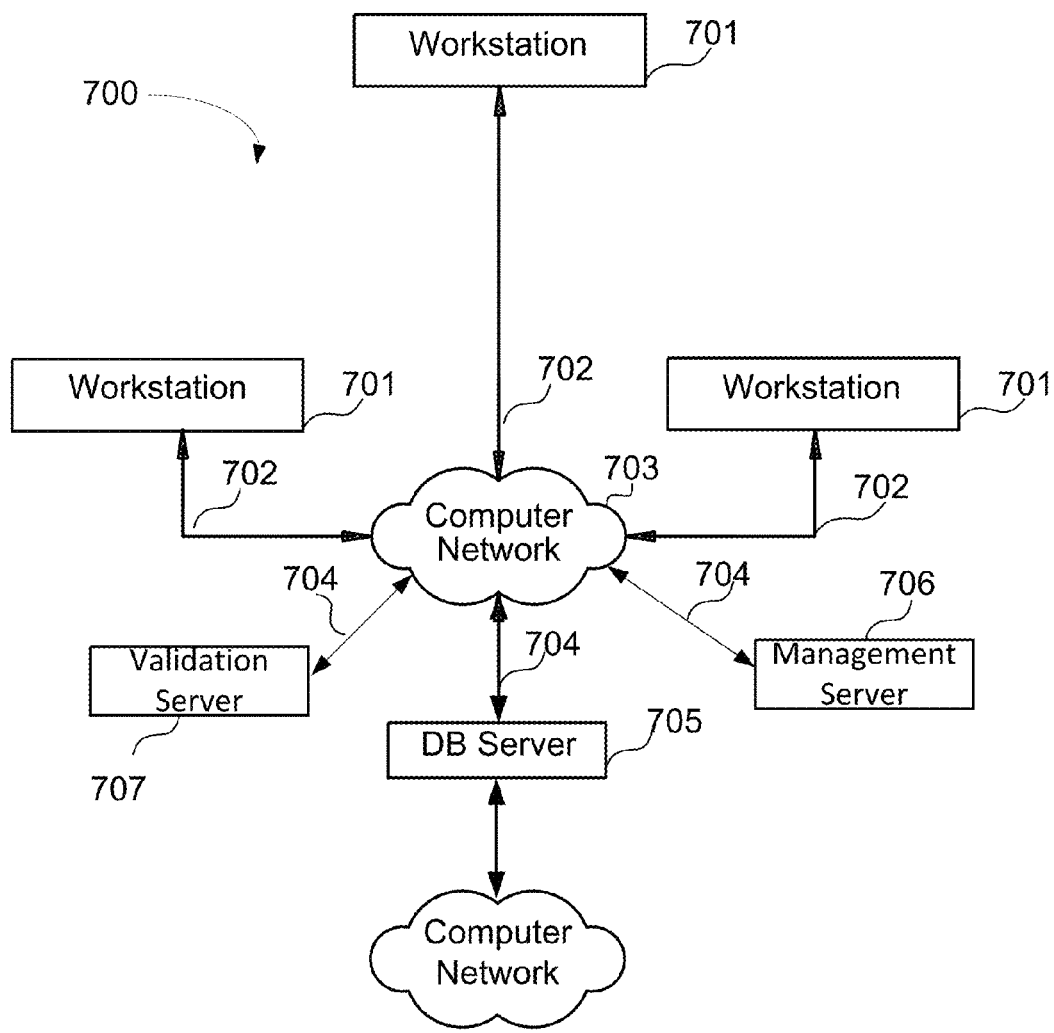
FIG. 7 shows an illustrative system for implementing exemplary embodiments according to one or more aspects of the present disclosure.

Referring to FIG. 7, an illustrative system 700 for implementing example embodiments according to the present disclosure is shown. As illustrated, system 700 may include one or more workstation computers 701 from which a business client can access pass phrases when challenged by a business client. Workstations 701 may be local or remote, and may be connected by one of communications links 702 to computer network 703 that is linked via communications links 704 to servers 705-707 (corresponding to storage device 503, challenge management server 502, and challenge validation server 504, respectively, as shown in FIG. 5). In system 700, server 705, 706, or 707 may be any suitable server, processor, computer, or data processing device, or combination of the same. Server 705, 706, or 707 may be used to process the instructions received from, and the transactions entered into by, one or more participants.

Computer network 703 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 702 and 704 may be any communications links suitable for communicating between workstations 701 and servers 705-707, such as network links, dial-up links, wireless links, and hard-wired links.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

What is claimed is:

1. An apparatus comprising:
   at least one memory device;
   at least one data storage device;
   at least one processor coupled to the at least one memory device and configured to perform, based on instructions stored in the at least one memory device:
   configuring a pass phrase based on a first input from an intended business client to a business associate;
   storing phrase information in the at least one data storage device, wherein the phrase information is indicative of the pass phrase and wherein the pass phrase comprises a valid challenge question and a corresponding answer;
   initiating, by the apparatus, a communication connection from the business associate to a called business client;
   in response to a challenge request from the called business client to the business associate over the communication connection, retrieving the phrase information from the at least one data storage device based on the challenge request;
   determining, from the retrieved phrase information, whether the challenge request from the called business client comprises the valid challenge question based on the first input from the intended business client;
   in response to the determining, generating an indicator indicative whether the called business client is the intended business client; and
   sending, by the apparatus, a responding answer from the business associate to the intended business client, wherein a degree of trust of the business associate is established with the intended business client based on the corresponding answer to the valid challenge question, and wherein the indicator is indicative that the called business client is the intended business client.

2. The apparatus of claim 1, wherein the at least one processor is further configured to perform:
   retrieving, from the at least one data storage device, a destination identification for the intended business client; and
   initiating the communication connection from the business associate to the called business client using the destination identification.

3. The apparatus of claim 1, wherein the at least one processor is further configured to perform:
   receiving the phrase information from the intended business client, wherein the phrase information includes a first answer to a first question;
   determining whether the intended business client is valid before accepting the phrase information; and in response to the determining, storing the phrase information in the at least one data storage device.

4. The apparatus of claim 3, wherein the at least one processor is further configured to perform:
repeating the receiving, the determining, and the storing for a second question and a second answer configured by the intended business client.

5. A computer-assisted method for validating a caller for a called person, the method comprising:
configuring a first pass phrase from a first input from an intended business client to a business associate;
storing first phrase information in the at least one data storage device, wherein the first phrase information is indicative of the first pass phrase and wherein the first pass phrase comprises a first valid challenge request and a first corresponding response;
initiating a communication connection from the business associate to a called business client;
in response to a received challenge request from the called business client to the business associate over the communication connection, retrieving the first phrase information from the at least one data storage device based on the received challenge request;
determining, from the retrieved phrase information, whether received challenge request from the called business client comprises the first valid challenge request, wherein the first valid challenge request was previously configured by the intended business client;
in response to the determining, generating an indicator indicative whether the called business client is the intended business client; and
when the indicator is indicative that the called business client is the intended business client, sending a responding answer from the business associate to the intended business client, wherein a degree of trust of the business associate is established with the intended business client based on the first corresponding response to the first valid challenge request.

6. The method of claim 5, further comprising:
configuring a second pass phrase based on a second input from the intended business client.

7. The method of claim 6, further comprising:
retrieving second phrase information indicative of a second pass phrase, wherein:
the business associate receives a second challenge request from the intended business client over the communication connection to provide a second challenge response that matches with the second pass phrase.

8. The method of claim 5, further comprising:
when a challenge response does not match with the first pass phrase, receiving, from the intended business client, a configuration request to reset the first pass phrase; and
retrieving reset information indicative of the reset first pass phrase, wherein:
the business associate receives a subsequent challenge request from the intended business client to provide a subsequent challenge response that matches with the reset first phrase; and
the business associate provides the reset first challenge response based on the retrieved reset information via the communication connection.

9. The method of claim 5, wherein:
the configuring comprises receiving a first answer to a first question;

the first received challenge request includes the first question;
the retrieving comprises obtaining the first answer; and
the first corresponding challenge response includes the first answer.

10. The method of claim 9, wherein:
the first answer comprises a representation of a speech waveform of the intended business client articulating the first answer; and
the first corresponding response comprises the representation of the speech waveform.

11. The method of claim 9, further comprising:
receiving, from the intended business client, contents indicative of the first question, wherein the intended business client is able to personalize the first question.

12. The method of claim 9, further comprising:
modifying the first answer to the first question.

13. The method of claim 9, further comprising:
deleting the first answer and the first question; and
creating a different answer to a different question.

14. The method of claim 5, wherein the configuring comprises:
receiving a speech waveform indicative of a first answer to a first question; and
converting the speech waveform to the first information.

15. The method of claim 14, wherein the first phrase information comprises a textual converted representation of the speech waveform.

16. The method of claim 5, wherein the configuring comprises:
verifying the intended business client before accepting the first input from the intended business client.

17. The method of claim 5, wherein:
the configuring comprises uploading graphical content from information provided by the intended business client;
the first received challenge request is directed to the graphical content; and
the retrieving comprises displaying the graphical content that is indicative of the first pass phrase.

18. A non-transitory computer-readable storage medium storing computer-executable instructions that, when executed, cause a processor at least to perform operations comprising:
configuring a first pass phrase from a first input from a intended business client to a business associate, wherein the first pass phrase comprises a first valid challenge question and a first answer;
storing first phrase information in at least one data storage device, wherein the first phrase information is indicative of the first pass phrase;
retrieving, from the at least one data storage device, a destination identification for the intended business client;
initiating a communication connection from the business associate to a called business client using the destination identification;
receiving, by the business associate from the called business client, a challenge request;
in response to the receiving, retrieving the first phrase information from the at least one data storage device based on the challenge request;
determining, from the retrieved first phrase information, whether the challenge request from the called business client comprises the first valid challenge question based on the first input from the intended business client;

in response to the determining, generating an indicator indicative whether the called business client is the intended business client;

in response to the retrieving, responding, by the business associate, with the first answer to the intended business client over the communication connection; and sending, by the apparatus, a responding answer from the business associate to the intended business client, wherein a degree of trust of the business associate is established with the intended business client based on the first answer to the first valid challenge question, and wherein the indicator is indicative that the called business client is the intended business client.

19. The non-transitory computer-readable storage medium of claim 18, wherein the computer-executable instructions, when executed, cause the processor to perform:

configuring a second pass phrase from a second input from the intended business client; and retrieving second phrase information indicative of a second pass phrase, wherein:

the business associate receives a second challenge question from the intended business client over the communication connection to provide a second challenge response matching with the second pass phrase.

20. The non-transitory computer-readable storage medium of claim 18, wherein the computer-executable instructions, when executed, cause the processor to perform:

when a challenge response does not match with the first pass phrase, receiving, from the intended business client, a configuration request to reset the first pass phrase; and retrieving reset information indicative of the reset first pass phrase, wherein:

the business associate receives a subsequent challenge request from the intended business client to provide a subsequent challenge response that matches with the reset first phrase; and the business associate provides the subsequent challenge response based on the retrieved reset information via the communication connection.

* * * * *